United States Patent
Hahn et al.

(10) Patent No.: US 9,135,936 B1
(45) Date of Patent: Sep. 15, 2015

(54) MICROACTUATED SUSPENSION WITH SPRING BIAS ACTING ON CONDUCTIVE ADHESIVE BOND FOR IMPROVED RELIABILITY

(71) Applicant: Magnecomp Corporation, Murrieta, CA (US)

(72) Inventors: Peter Hahn, Ayutthaya (TH); Steve Misuta, Murrieta, CA (US); Long Zhang, Murrieta, CA (US); Kuen Chee Ee, Chino, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/664,846

(22) Filed: Mar. 21, 2015

Related U.S. Application Data

(60) Provisional application No. 61/969,148, filed on Mar. 22, 2014.

(51) Int. Cl.
*G11B 5/48* (2006.01)

(52) U.S. Cl.
CPC ............ *G11B 5/4853* (2013.01); *G11B 5/4826* (2013.01); *G11B 5/4873* (2013.01)

(58) Field of Classification Search
CPC .. G11B 5/5552; G11B 5/4826; G11B 5/4873; G11B 5/4833; G11B 5/4853
USPC ..................................................... 360/294.4
See application file for complete search history.

(56) References Cited

U.S. PATENT DOCUMENTS

| | | | |
|---|---|---|---|
| 5,228,324 A | 7/1993 | Frackiewicz et al. | |
| 6,011,239 A | 1/2000 | Singh et al. | |
| 7,218,481 B1 | 5/2007 | Bennin et al. | |
| 7,459,835 B1 | 12/2008 | Mei et al. | |
| 7,532,438 B1 | 5/2009 | Mei et al. | |
| 7,751,153 B1 * | 7/2010 | Kulangara et al. | 360/294.6 |
| 8,189,301 B2 * | 5/2012 | Schreiber | 360/294.4 |
| 8,254,062 B2 | 8/2012 | Greminger | |
| 8,570,688 B1 * | 10/2013 | Hahn et al. | 360/294.4 |
| 8,908,332 B2 * | 12/2014 | Shum et al. | 360/294.4 |
| 2011/0249366 A1 * | 10/2011 | Fujimoto et al. | 360/294.4 |

* cited by examiner

*Primary Examiner* — Mark Blouin
(74) *Attorney, Agent, or Firm* — Intellectual Property Law Offices of Joel Voelzke, APC

(57) ABSTRACT

In an electrical connection to a microactuator in a disk drive suspension, an electrical lead is adhered to a microactuator using conductive adhesive and is also mechanically pressed up against the microactuator using a bias mechanism. The bias mechanism may be a spring finger that is welded to the suspension, or it may be a stainless steel finger that is formed integrally with the trace gimbal assembly. The resulting bias force that presses the contact against the microactuator surface reduces the small failure rate that can occur when the conductive adhesive separates from the microactuator's surface as a result of stress such as induced by thermal cycling.

20 Claims, 4 Drawing Sheets

MICROACTUATED SUSPENSION WITH SPRING BIAS ACTING ON CONDUCTIVE ADHESIVE BOND FOR IMPROVED RELIABILITY

CROSS-REFERENCE TO RELATED APPLICATIONS

This application claims priority from U.S. Provisional Patent Application No. 61/969,148 filed Mar. 22, 2014.

BACKGROUND OF THE INVENTION

1. Field of the Invention

This invention relates to the field of dual stage actuated (DSA) suspensions for disk drives. More particularly, this invention relates to the field of electrical connections to microactuators in DSA suspensions.

2. Description of Related Art

Magnetic hard disk drives and other types of spinning media drives such as optical disk drives are well known. A disk drive suspension is the assembly that aligns the read/write head over the correct place on the spinning data disk, in order to write data to, and read data from, the desired data track on the disk.

Both single stage actuated disk drive suspensions and dual stage actuated (DSA) suspension are known. In a single stage actuated suspension, only a voice coil motor moves the actuator arm with the slider affixed to the distal end. In a DSA suspension, as in U.S. Pat. No. 7,459,835 issued to Mei et al. as well as many others, in addition to the voice coil motor which moves the entire suspension, at least one secondary actuator, often referred to as a microactuator, is located upon the suspension in order to effect fine movements of the magnetic head slider thereby maintaining proper alignment over the appropriate data track on the spinning disk. The microactuator(s) provide much finer control and a higher bandwidth of the servo control loop than does the voice coil motor alone which is capable of effecting relatively coarse movements of the suspension and hence the magnetic head slider. Lead zirconium titanate is one of the broadly used intermetallic inorganic compounds possessing piezoelectric properties and is commonly referred to as PZT. PZTs are often used as the microactuator motor, although other types of microactuator motors are possible.

Various structures and methods have been proposed for making the required electrical connections to the PZT microactuators. One structure and method is to bond a gold plated copper contact pad that is part of the suspension's flexible circuit to a gold plated (metalized) surface of a PZT using conductive epoxy.

In the discussion that follows, it will be assumed without explicitly reciting that the copper contact pad is coated with gold or some other protective metal, and that the PZT surface is metalized with gold or some other relatively non-corroding metal.

Another structure and method is disclosed in U.S. Pat. No. 8,570,688 issued to Hahn et al, which is owned by the assignee of the present invention. That structure and method use a stainless steel spring to press the copper contact pad against the PZT surface optionally with conductive grease between those two surfaces, and/or with a protective pad between the spring finger and the contact pad in order to eliminate or reduce fretting. The copper contact pad and the PZT's electrode are thus physically pressed together and physically held together. The conductive grease enhances the electrical connection between them. In that proposal the bias pressure provided by the spring eliminates the need for conductive epoxy between the two parts.

The industry continues to seek ways to improve the quality of the electrical connection to the PZT microactuator, to improve the reliability of that connection, and to reduce the cost of making it.

SUMMARY OF THE INVENTION

The connection method disclosed in U.S. Pat. No. 8,570,688 involving a bias spring and conductive grease has not shown to be 100% satisfactory under all conditions, and thus has not displaced the use of conductive epoxy for the contact pad-to-PZT connection. Furthermore, a conductive epoxy connection has also been shown to be less than 100% satisfactory under all conditions. The inventors of the present application have discovered that the conductive epoxy connection from gold plated copper to gold plated PZT material suffers from reliability problems particular upon thermal cycling in which the temperature is varied from −50° to +150° C. and the difference in coefficients of thermal expansion between the PZT material and the epoxy causes physical stresses to be placed on the epoxy bond, sometimes creating a small gap between the silver fibers in the conductive epoxy compound and the circuit's gold surface, thus increasing the electrical resistance of the bond sufficiently to produce a very small albeit measurable defect rate in the parts after thermal cycle testing.

The inventors have further discovered a way to reduce the incidences of this failure mechanism. According to a first aspect of the invention, the electrical and mechanical bond is made using a conductive adhesive such as conductive epoxy, and a spring bias is applied to press together the gold plated copper and the gold plated PZT (or stainless steel) with the epoxy therebetween, with the spring bias forcing pressing those components together before, during, and/or after the epoxy curing step. Applying a bias before and/or during the epoxy curing step presses the silver fibers up against the gold surface and thus creates a stronger bond than in the absence of such a bias. Furthermore, applying a bias after the epoxy curing step and during operation of the device helps to hold the silver fibers against the gold surface, thus allowing those fibers to better resist tearing away from the surfaces during operation especially during thermal cycling.

In one embodiment an additional spring structure comprising a spring metal is welded to the suspension.

In another embodiment a spring finger or arm can be integrally formed with the trace gimbal. It is important to manufacture the device so that the spring finger is at a consistent height above the PZT and presses against the PZT with a consistent force. By laser adjusting the height of the end of the spring finger, and using automated optical inspection (AOI) feedback to achieve the desired height and the desired spring tension, the repeatability and hence reliability of those parameters and the bond joints can be improved.

Regardless of whether the spring is an external structure that is affixed to the suspension such as by welding or is integrally formed with the trace gimbal, or takes the form of some other structure, the spring configuration and hence spring bias can be adjusted as desired using laser adjustment techniques and automated optical inspection feedback, thus improving the repeatability and reliability of the resulting bond joints.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
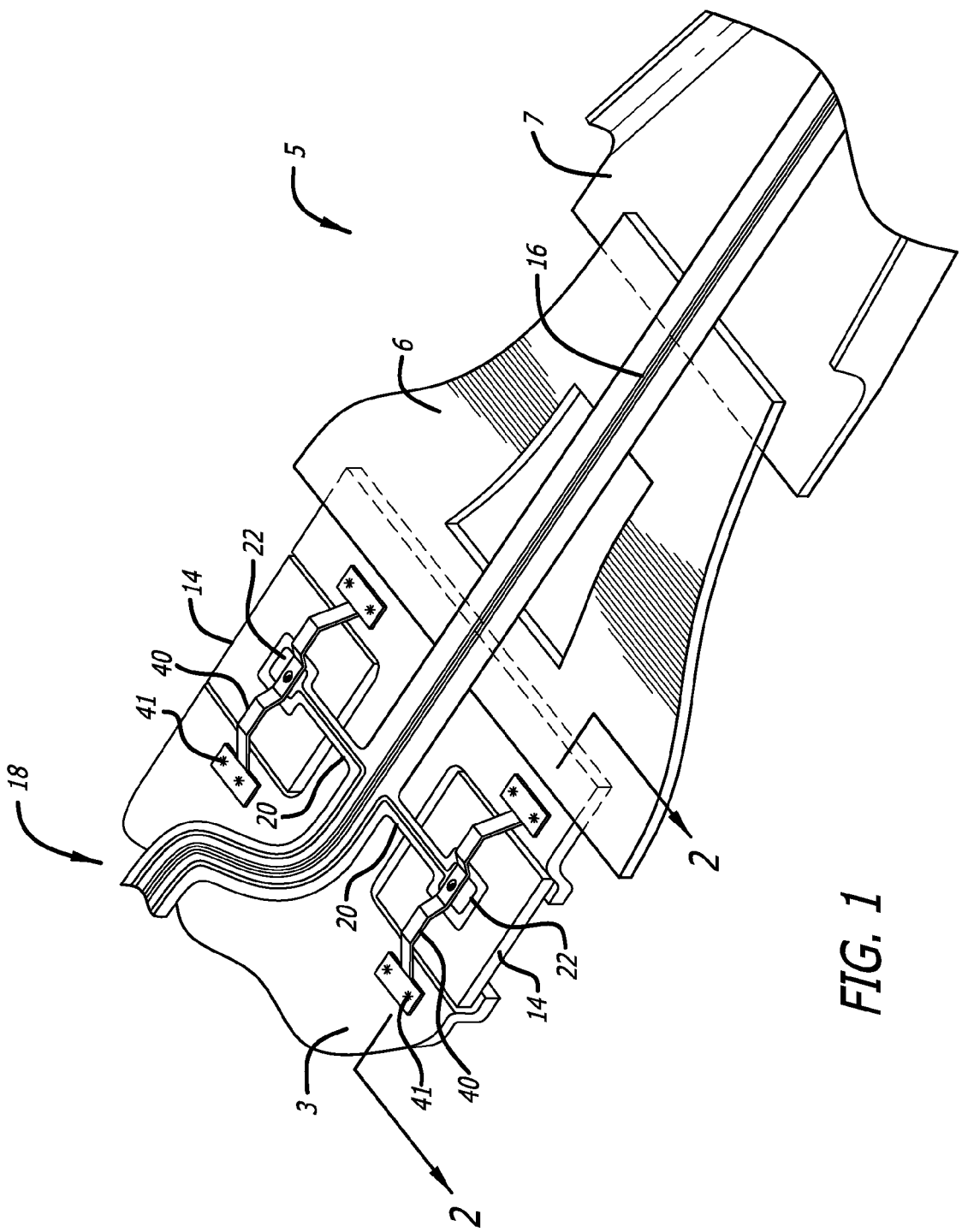
FIG. 1 is a top perspective view of a DSA suspension having a PZT and a copper contact pad biased against the PZT according to a first exemplary embodiment of the invention.
Figure 2:
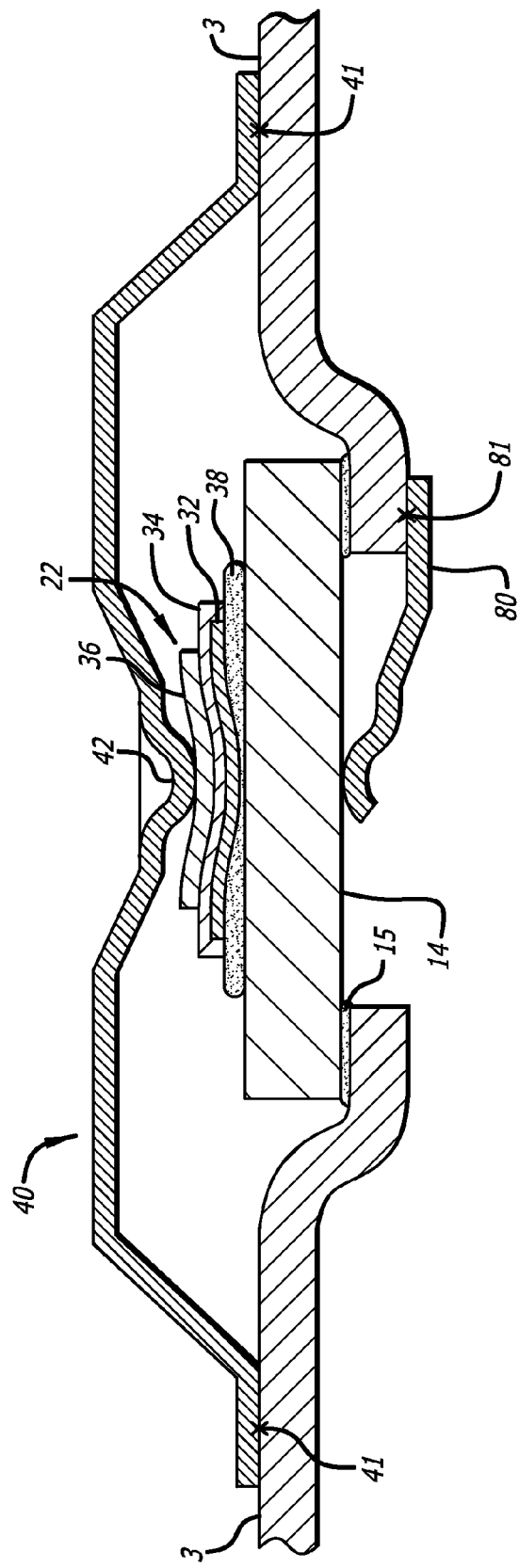
FIG. 2 is a sectional view of the suspension of FIG. 1 taken along section line 2-2.

The bias force for use in the invention can be provided using structures and methods such as disclosed in U.S. Pat. No. 8,570,688 issued to Hahn et al. which is hereby incorporated by reference in its entirety. FIG. 1 is a top perspective view of a DSA suspension assembly 5 having a PZT 14 and a copper contact pad 22 biased against the PZT according to a first exemplary embodiment of the invention, and FIG. 2 is a sectional view thereof taken along section line 2-2. Contact pad 22 including copper contact pad 32 lies at the end of circuit finger 20 which is part of the suspension's flexible circuit 18. A copper signal trace within flexible circuit 18 carries the PZT driving voltage to copper contact pad 32. Other traces within flexible circuit 18 define the signal lines to and from the read/write head. The trace gimbal assembly 16 includes the flexible circuit 18 and the gimbal (not shown) which supports the read/write head for writing data to, and reading data from, the data storage media such as a spinning magnetic hard disk. A bent stainless steel finger 40 having a dimple 42 formed in it acts as a spring and is welded to the suspension at weld points 41. Spring finger 40 helps to press copper contact pad 32 against the top surface PZT 14. Spring 40 provides the desired bias force to bias copper contact pad 32 against conductive adhesive 38 and towards the electrode of PZT 14. Optional insulating coverlayer 34 can be included over copper contact pad 32. Optional protective pad 36 helps to protect against fretting. An additional ground spring 80 can be welded to the suspension body part 3 at weld point 81 to press against the ground electrode of PZT 14. Conductive epoxy 15 also provides a ground path from the PZT's bottom electrode to the grounded suspension part 3, which in this particular illustration is the base plate but could also be the load beam 7 or the gimbal. Also seen in the figure are suspension spring or hinge 6 and load beam 7. These figures of the present application are similar to FIGS. 4 and 5 of U.S. Pat. No. 8,570,688 although the present version employs conductive adhesive such as conductive epoxy instead of the conductive grease shown and described in that patent.

Similarly, the arrangement shown in FIGS. 6 and 7 of U.S. Pat. No. 8,570,688 in which a dimple is used as a spring feature, could be adapted for use with the present invention, again with conductive epoxy being applied between the copper contact pad and the PZT electrode surface.

Figure 3A:
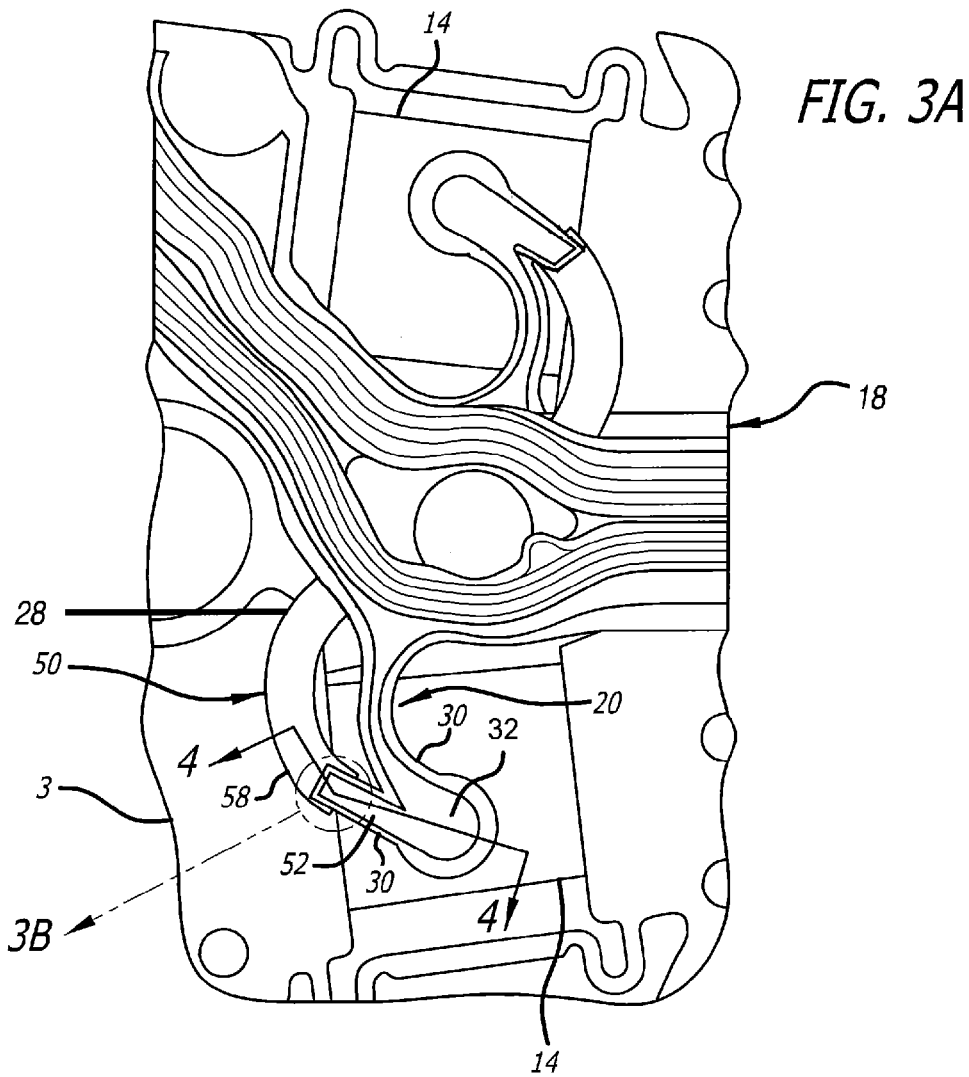
FIG. 3A is a top plan view of a suspension in which a spring finger is integrally formed with the trace gimbal assembly.
Figure 3B:
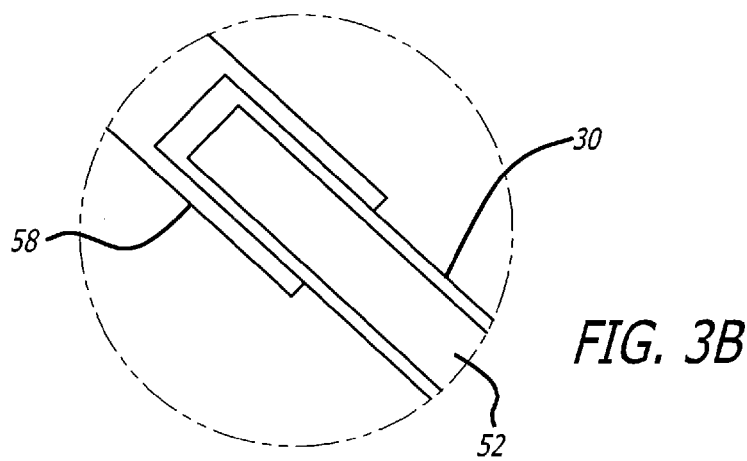
FIG. 3B is a detailed view of the area indicated in FIG. 3A.
Figure 4:
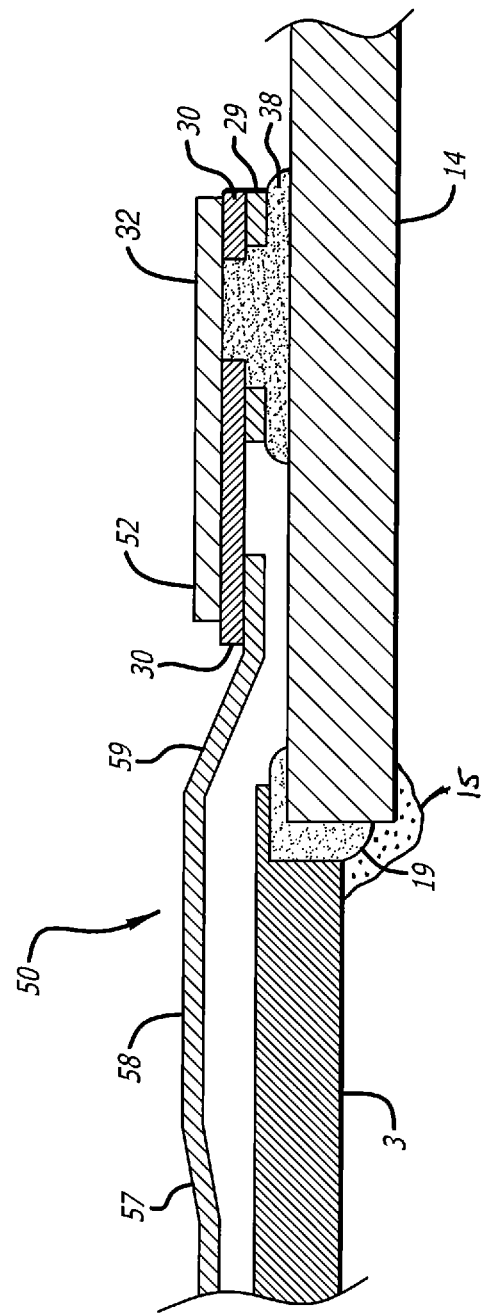
FIG. 4 is a sectional view of the suspension of FIG. 3A taken along section line 4-4.

FIG. 3A is a top plan view of a suspension in which two spring fingers 20 are integrally formed with the trace gimbal assembly (TGA) 16. FIG. 3B is a detailed view of the area indicated in FIG. 3A. FIG. 4 is a sectional view of the suspension of FIG. 3A taken along section line 4-4. Trace gimbal assembly 16 includes the gimbal (not shown) which supports the head slider and allows it to freely rotate in each of three rotational axes, and also includes the flexible circuit 18. Flexible circuit 18 typically comprises a metal support layer 28 such as stainless steel, an insulative layer 30 such as polyimide, and a conductive layer such as copper or copper alloy for carrying electrical signals including the read/write signals to and from the head slider, and the activation voltages for activating the PZT microactuators 14.

Spring finger 50 is integrally formed of the metal support layer 28, typically stainless steel, of flexible circuit 18. More generally, spring finger 50 could be formed of any spring metal. The spring finger 50 constitutes a second finger.

First and signal-carrying finger 20 includes a copper contact pad 32 formed of the signal conductive layer of the flexible circuit, and polyimide 30 or other insulator from the flexible circuit's insulative layer. At the end of finger 20 a stainless steel ring 29 constitutes an isolated island of stainless steel electrically isolated from most of the rest of the stainless steel layer 28 of trace gimbal assembly 18. That stainless steel layer 28 is typically grounded to the suspension body. Copper contact pad 32 is part of copper signal conductive layer. Conductive adhesive 38 completes the electrical path from copper contact pad 32 at the end of the copper signal conductor to the positive or driven electrode of PZT 14. The opposite surface of the PZT which constitutes the ground electrode is grounded to the base plate 3, the load beam 7, or whichever metal part of the suspension to which it is mounted, typically via conductive adhesive 15 such as conductive epoxy. The PZT 14 mounting may include non-conductive structural epoxy 19. Typically, a cover layer (not shown) is applied over the copper conductor for electrical insulation and anti-corrosion purposes. Signal-carrying finger 20 carries the driving voltage that activates PZT 14. In a typical suspension the two PZTs 14 on opposite lateral sides of the suspension assembly are poled or are arranged oppositely, such that a single common voltage is applied to both PZTs thus causing one to expand in the x-direction while the other contracts in the same direction. That arrangement creates a push-pull effect to rotate the portion of the suspension that is distal to the PZTs and thus moves the head slider in an arc over the disk platter.

In this embodiment, spring finger 50 is separate from signal-carrying finger 20, and both fingers are generally curved and extend generally in parallel with each other until they meet at their ends, with the end of spring finger 50 pressing down against copper contact pad 32, pressing that contact pad down against the conductive adhesive 38 and toward PZT 14.

The stainless steel or other spring metal of which spring finger 50 is formed must be electrically isolated from copper contact pad 32 in order to avoid shorting the PZT's driven electrode to grounded suspension body part 3. One way to accomplish the required electrical isolation is shown in the figures, in which the stainless steel portion 58 of spring finger 50 is electrically isolated from stainless steel ring 29, and is physically connected to it by a short copper finger 52 with polyimide 30 electrically and physically separating the copper and stainless steel layers. Thus, spring finger 20 includes both a majority portion 58 thereof that includes stainless steel, and a short minority portion 52 thereof of copper, and another section having both stainless steel and copper separated by polyimide 30, with all of those materials integrally formed with, and as part of, the suspension's trace gimbal assembly 16 including its flexible circuit 18. The physical bias force provided by spring finger 50 is transferred at least in part through copper section 52. Copper section 52 could be reinforced by being made thicker than the rest of the copper layer, especially if the TGA is made using an additive method in which case it would be relatively easy to add additional copper or some other material to copper section 52 in order to transmit the bias force from spring finger 50 to copper contact pad 32.

Spring finger 50 can have one or more bends 57, 59 formed therein to adjust both the height of the ends of the springs and the bias force that will be applied against the contact pad. The bends can be formed and adjusted using mechanical bending, by laser adjustment, or other adjustment techniques before and/or after the PZT attachment step. Laser adjustment involves using a laser to locally heat and partially melt a piece or section of metal, and then cooling the metal, to impart a permanent bend in the metal without applying a mechanical force to bend it. Such techniques are disclosed generally in the literature including U.S. Pat. No. 5,228,324 to Frackiewicz which is incorporated herein by reference in its entirety. By laser adjusting the height of the end of the spring finger 50, and using automated optical inspection (AOI) feedback to achieve the desired height and hence the desired spring tension, the repeatability and hence reliability of the bond joints can be improved.

Although the stainless steel material used in the trace gimbal assembly is relatively thin, springs made from the stainless steel layer of the trace gimbal assembly after laser adjustment can provide several mg of bias force, which is enough to make a significant difference in the reliability of the bond of the copper bond pad which has a surface area of only around 0.09 mm$^2$. The total bias force applied by the stainless spring or other bias mechanism is preferably at least 1 mg which is approximately $1 \times 10^{-5}$ N, and more preferably at least 2 mg which is approximately $2 \times 10^{-5}$ N. The bias pressure applied at the copper bond pad is preferably at least 10 Pa, and more preferably at least 20 Pa.

Laser adjust techniques and other adjustment techniques can also be applied after the conductive adhesive on the PZT has been partially hardened and/or fully hardened in order to provide a desired amount of bias during operation of the device.

Although the invention has been described with reference to piezoelectric microactuators, it will be appreciated that the invention is applicable more generally to other types of microactuators, and indeed to more generally still to making electrical connections to various types of electronic components than just microactuators.

We claim:

1. A dual stage actuated suspension comprising:
a beam;
a read/write head located on the beam for writing data to, and reading data from, a spinning data disk;
a microactuator affixed to the suspension;
a trace gimbal assembly, the trace gimbal assembly including a metal support layer, an insulative layer, and a conductive layer for carrying electrical signals, the conductive layer including an electrical contact pad;
wherein the trace gimbal assembly further includes:
a first finger extending to the microactuator, the first finger including a signal trace formed of the conductive layer of the trace gimbal assembly for carrying a driving voltage for activating the microactuator, and further including the electrical contact pad, the electrical contact pad being affixed to the microactuator; and
a second finger separate from the first finger, the second finger also extending to the microactuator and to the contact pad, the second finger having at least a portion thereof formed of the metal support layer of the trace gimbal assembly and being electrically isolated from the contact pad.

2. The dual stage actuated suspension of claim 1 wherein the second finger is bent and provides a mechanical bias pressing against the contact pad.

3. The dual stage actuated suspension of claim 2 wherein the second finger further comprises a portion formed from the conductive layer of the trace gimbal assembly, the conductive layer portion of the second finger being electrically isolated from the metal support layer portion thereof, the mechanical bias being transmitted at least in part through said conductive layer portion.

4. A dual stage actuated suspension comprising:
a beam;
a read/write head located on the beam for writing data to, and reading data from, a spinning data disk;
a microactuator affixed to the suspension;
a flexible circuit for providing a driving voltage to an electrode of the microactuator, the circuit including an electrical contact pad;
a conductive adhesive mechanically and electrically bonding the electrical contact pad to the microactuator's electrode; and
a bias mechanism that provides a mechanical bias pressing the contact pad against the conductive adhesive and toward microactuator's electrode.

5. The dual stage actuated suspension of claim 4 wherein the bias mechanism is a metal spring.

6. The dual stage actuated suspension of claim 4 wherein the bias mechanism is a metal spring that is welded to the suspension.

7. The dual stage actuated suspension of claim 4 wherein the bias mechanism comprises a stainless steel finger of a trace gimbal assembly.

8. The dual stage actuated suspension of claim 7 wherein the stainless steel finger that provides the bias to the contact pad is integrally formed as a part of a trace gimbal assembly which includes the contact pad.

9. The dual stage actuated suspension of claim 7 wherein the stainless steel finger that provides the bias to the contact pad is separated horizontally from and extends generally parallel to a conductive signal trace of the trace gimbal assembly that provides the driving voltage to the microactuator's electrode.

10. The dual stage actuated suspension of claim 7 wherein the stainless steel finger has a bend in it.

11. The dual stage actuated suspension of claim 10 wherein the bend in the stainless steel finger occurs at a location at which no insulative layer covers the stainless finger.

12. The dual stage actuated suspension of claim 10 wherein the bend in the stainless steel finger was produced by mechanically bending the finger.

13. The dual stage actuated suspension of claim 10 wherein the bend in the stainless steel finger was produced by laser bending.

14. The dual stage actuated suspension of claim 4 wherein the bias mechanism presses the contact pad against the microactuator with a bias force of at least $1 \times 10^{-5}$ N.

15. In a dual stage actuated suspension including a microactuator mounted on the suspension for effecting fine movements of a head slider affixed to the suspension, a method of operationally connecting a microactuator to a disk drive suspension, the method including:

adjusting a spring; and bonding an electrical contact pad to the microactuator using conductive adhesive, the spring biasing the contact pad against the conductive adhesive and toward the microactuator.

16. The method of claim 15 wherein the spring adjusting step comprises adjusting the spring before bonding the microactuator to the suspension.

17. The method of claim 16 wherein the spring adjusting step comprises using automated optical feedback to adjust the spring to a desired height.

18. The method of claim 16 wherein the spring presses against the electrical contact pad against the conductive adhesive before the conductive adhesive has completely hardened.

19. The method of claim 15 wherein the spring adjusting step comprises adjusting the spring after bonding the microactuator to the suspension.

20. The method of claim 15 wherein the spring adjusting step comprises laser adjusting.

* * * * *

UNITED STATES PATENT AND TRADEMARK OFFICE
CERTIFICATE OF CORRECTION

PATENT NO.         : 9,135,936 B1
APPLICATION NO.    : 14/664846
DATED              : September 15, 2015
INVENTOR(S)        : Peter Hahn et al.

It is certified that error appears in the above-identified patent and that said Letters Patent is hereby corrected as shown below:

In the Claims

In claim 4, column 6, line 28, after "toward" insert -- the --.

In claim 11, column 6, line 52, after "covers the stainless" insert -- steel --.

Signed and Sealed this
Nineteenth Day of January, 2016

Michelle K. Lee
*Director of the United States Patent and Trademark Office*